United States Patent [19]

Brignon

[11] 4,406,789
[45] Sep. 27, 1983

[54] APPARATUS AND INSTALLATION FOR SEPARATING IMMISCIBLE LIQUIDS WITH DIFFERENT SPECIFIC GRAVITIES

[75] Inventor: François Brignon, Villemomble, France

[73] Assignee: Establissemens Andre Bardet S.A., Montreuil, France

[21] Appl. No.: 254,532

[22] Filed: Apr. 15, 1981

[30] Foreign Application Priority Data

Apr. 21, 1980 [FR] France .................................. 80 08931

[51] Int. Cl.³ ................................................ B01D 17/02
[52] U.S. Cl. .................................. 210/519; 210/532.1
[58] Field of Search .............. 210/800, 801, 513, 519, 210/532.1

[56] References Cited

U.S. PATENT DOCUMENTS 3,224,593 12/1965 Nebolsine ............................ 210/519
3,794,171 2/1974 Kimura et al. .................. 210/519 X
4,252,649 2/1981 Farret ................................... 210/800

Primary Examiner—Thomas G. Wyse
Attorney, Agent, or Firm—James & Franklin

[57] ABSTRACT

The invention relates to an apparatus and a plant for separating immiscible liquids.

The apparatus includes a cylindrical tank (1) wherein there are provided a separation chamber (2), a heavy liquid phase collecting chamber (3) and a light liquid phase collecting chamber (4), said chambers being separated by a partition in the shape of a funnel (5) opening at its top in the collecting chamber (4) and by radial partitions (6 and 7) which separate the two collecting chambers, the tank (1) moreover containing a toroidal distributor (10) provided with holes (11) directed upwardly and located in the separation chamber (2) at the bottom of funnel (5), as well as a toroidal header (13) arranged at the bottom of said chamber and provided with a vertical riser (15) which opens into the upper portion of the heavy phase collecting chamber (3).

9 Claims, 3 Drawing Figures

APPARATUS AND INSTALLATION FOR SEPARATING IMMISCIBLE LIQUIDS WITH DIFFERENT SPECIFIC GRAVITIES

BACKGROUND OF THE INVENTION

The present invention relates to an apparatus and a plant for separating two immiscible liquids of different specific gravities.

The invention is more particularly applicable to the deoiling of cleaning agents of industrial use such as especially industrial cleaning solutions.

Industry in general and more particularly the mechanical industry uses an enormous quantity of cleaning agents for scouring or clearing and washing manufactured parts and, both for economy purposes and for meeting the regulations governing oil discharge into surface-, underground- and sea-waters, it became absolutely essential to treat as thoroughly as possible, in particular, the waste cleaning solutions and the washing water from industrial cleaning machines, the purpose of the treatment being, on the one hand, to limit pollution and, on the other hand, to afford separate recovery of the oils and scouring agents for re-use thereof.

Separation of the two liquid phases of an emulsion or a suspension is a so-called "breakage" operation which can be effected either by a chemical or by a physical process, the method used according to the invention being related to the latter process and using the physical phenomenon of coalescence between the fine oil droplets suspended in the scouring agent to be purified. It should be remembered that coalescence is the ability of the particles in a finely divided liquid to join together so as to reconstitute a continuous liquid phase.

Of course, the use of this physical phenomenon for separating two immiscible liquids is already known and practised in numerous plants designated to break a dispersion of oil in an aqueous phase. In particular, separation apparatuses are known which include parallel, slanted banks of coalescence plates, between which banks the scouring agent to be deoiled flows, said coalescence plates being provided with corrugations on certain separators.

Separating apparatuses are also known wherein the coalescence and settling phenomena are associated, sometimes with an attempt to increase the separation speed by imparting a rotary motion to the mixture to be purified introduced into the separator.

In all these known apparatuses, the coalescence of the oil droplets generally occurs in counter flow to the liquid phase wherein the droplets are suspended, this resulting in a low separation efficiency and requiring the use of over-sized plants to afford a sufficient recovery output. Moreover, in the aforementioned separators, the rotary motion of the liquid mixture fed to the apparatus creates an internal turbulence which causes permanent mixing of the phases and counteracts the natural coalescence of the oily droplets. The result is a substantial reduction in efficiency which has to be compensated by several runs of the mixture through the separator, to the prejudice of the plant output.

Thus, more precisely, there are known in the prior art:

U.S. Pat. No. 1,920,565 relating to a process and an apparatus for the separation of oil-water mixtures.

The apparatus shown in this U.S. patent consists of a first separator A wherein a first separation of oil from water is effected. The residue that still contains some oil is fed to an apparatus B and contacted with a light oil that may or not contain an emulsion-controlling agent such as a calcium oleate. This mixture in then separated in a second separator C into pure water and oil.

The apparatus shown in this reference requires both addition of light oil and a mixing or stirring chamber together with stirring means.

DE OS No. 2,652,632 which describes a plant for recovering oil including notably an elongate ducting 42 extending along the periphery of a tank 32, said duct 42 having a plurality of apertures 34 in communication with tank 32. A pipe 18 feeds the oil/water mixture to be separated to ducting42 and the mixture is separated by flowing through coalescence means 48.

This plant is applied to a ship

FR Pat. No. 577,288 which describes an apparatus to effect separation between petroleum and water. This apparatus consists of a U-shaped duct including two legs a and b. This document teaches an adjustment in height along leg b by means of a sleeve g.

U.S. Pat. No. 2,342,950 which describes an apparatus for treating liquids such as oil emulsions or mixtures comprising cold oil, oil emulsions and water by heating the liquid, evolving those components of the liquid as are easy to gasify, then separating the water from the oil in a calm area.

FR patent application No. 74/41,972 issued under No. 2,255,931 which describes an oil separating device including a separation chamber 16 wherein the rising oil flow past baffles 26. The oil is discharged through an overflow 33 located at an adjustable level.

GB Pat. No. 787,804 which describes a method and an apparatus for separating oil from ballast water in tanks of oil tankers. According to this GB patent, provision is made to pump the oil and water mixture until an oil-free surface is obtained, while aerating the mixture of the two liquids to facilitate separation thereof.

GB Pat. No. 205,935 which describes a method and an apparatus for separating liquids of different specific gravities, especially an oil and water mixture.

The apparatus mentioned in this GB Pat. No. 205,935 includes a tank $D^1$ wherein the water-oil mixture to be separated is fed. Said mixture flows through a pipe D to be directed against a deflecting plate $D^2$. A main separation chamber $A^1$ and a tubular casing B are permanently full of liquid, chamber A being full of water while casing B is full of oil. The water flows through pipe E and is directed to tank $F^1$. The oil flows into receptacle $B^1$ and is discharged through overflow $B^2$.

FR Pat. No. 1,459,465 which describes an apparatus for separating oil from a spent oil and water mixture.

The apparatus comprises a tank 1 wherein the mixture to be separated is fed through a pipe 4. The mixture is discharged into portion 3 of tank 1 through an annular pipe 5 provided with perforations; the mixture being discharged along the wall of a baffle 6. This action is continued until the mixture reaches the discharge pipe 23. The floating oil is then removed through pipe 23. This FR Pat. No. 1,459,465 relates to an apparatus whereof the principle is different from that of the present invention; indeed, it will be appreciated that the conical surface converges (diminishes in area) downwards, i.e. in opposite direction to the natural motion of the oil particles which tend to rise.

Consequently, the coalescence is not promoted by the reduction in area.

Moreover, the oil particles are first set into motion downwards, while the gravity separation occurs according to the present invention, as described hereinafter, due to the fact that these particles rise immediately as they enter the working chamber.

In the apparatus according to FR Pat. No. 1,459,465, the oil drops are subjected to an artificial, unfavourable motion, which tends to carry them downwards with the dense liquid flow.

The object of the present invention is therefore to provide an apparatus for continuous separation as well as a plant incorporating said apparatus and allowing a very extensive continuous separation to be effected between two immiscible liquids of different specific gravities with a very high efficiency under reduced space requirements.

SUMMARY OF THE INVENTION

According to the invention, the apparatus for continuously separating two immiscible liquids of different specific gravities includes a tank having provided therein separate chambers for collecting a light and a heavy liquid phases and a separation chamber which contains a light phase header in its upper portion, a heavy phase header in its lower portion and a static mixture distributor between the two headers, said headers affording communication between the separation chamber and the corresponding collecting chambers, this apparatus being characterized in that the upper portion of the separation chamber is delimited by a wall in the shape of a funnel converging upwards having at its top a port opening into the light phase collecting chamber, in that the static distributor consists of an internal peripheral duct extending horizontally about the side wall of the tank and including distribution holes at regular intervals around the latter, and in that the heavy phase header includes a hollow header element provided with take off holes on its lower side and a riser which communicates with the interior of said element and opens into the heavy phase collecting chamber at a level slightly lower than that of the port at the funnel top.

Preferably, the holes in the distributor open upwards, close to the bottom of the funnel which forms the upper wall of the separation chamber. As regards the heavy phase header, this preferably consists of a loop-shaped duct which extends horizontally near the bottom of the separation chamber and of a vertical riser connected to the annular duct and having its outlet port slightly lower than the outlet port of the light phase collecting funnel.

The bottom of the separation chamber may be in the shape of a downwardly converging funnel with the annular duct of the heavy phase header arranged substantially at the middle of the height of said funnel.

For continuously effecting a very extensive separation between the two liquids, there is provided, according to the invention, a separation plant including a battery of two apparatuses having the characteristics stated above, said apparatuses being series-connected and the plant moreover including an expansion and degassing vat connected to the inlet of the distributor of a first of said apparatuses, a reservoir for recycle under load with a float-operated regulation, take-off means with a constant level difference immersed in the bath and means for pumping the liquids from the bath to the expansion vat, the outlets of the heavy phase collecting chambers of the first and second apparatuses being respectively connected to the static distributor of the second apparatus and to the tank containing the bath to be purified, while the outlets of the light liquid phase collecting chambers of the first and second apparatuses are respectively connected to a recovery vat and to the recycle reservoir, whereof the outlet is in turn connected to the pumping means upstream thereof.

According to the invention, the take-off means with a constant level difference comprise a stationary duct connected to the pumping means and having a vertical end section, a tube sliding in said section and floats supporting the sliding tube at a predetermined depth in the bath.

BRIEF DESCRIPTION OF THE DRAWING

The invention will now be described in more details with reference to a particular embodiment given by way of non restrictive example and shown on the appended drawings, wherein.

DETAILED DESCRIPTION OF PREFERRED EMBODIMENT

Figure 1:
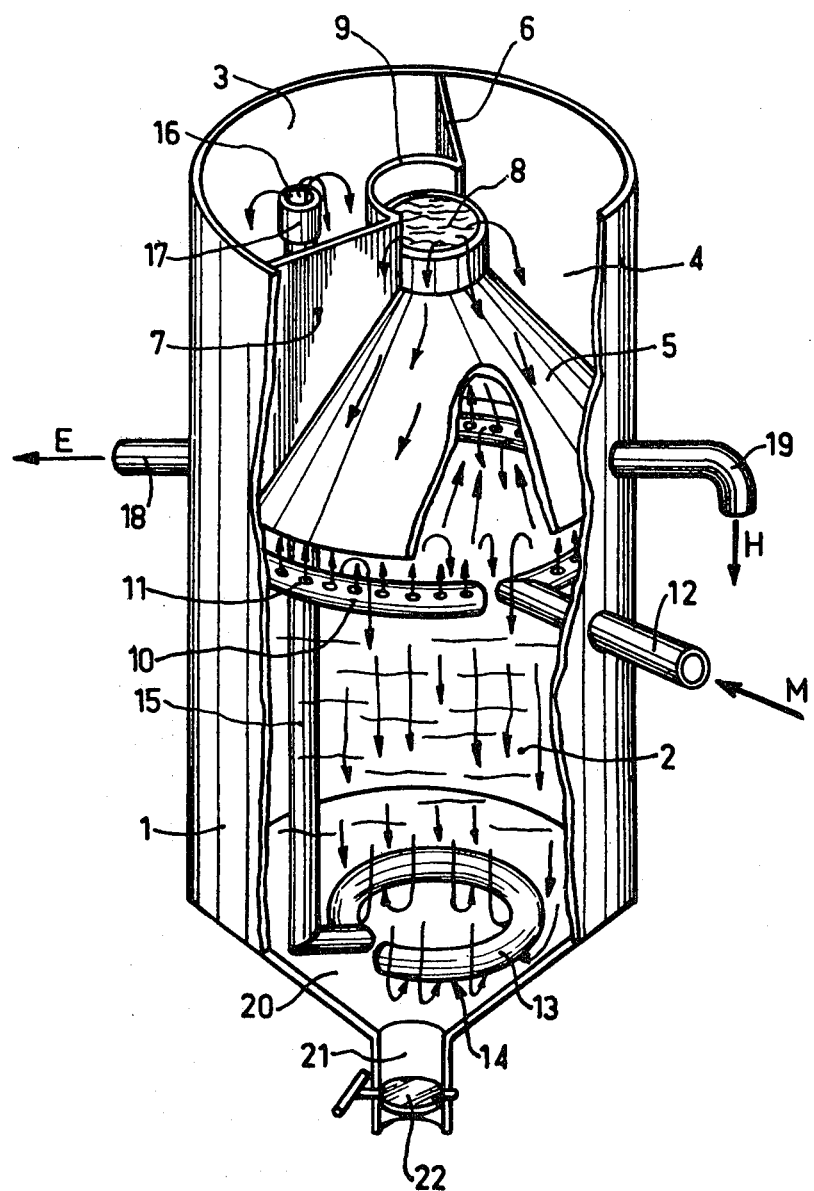
FIG. 1 is a partly broken perspective view of a separation apparatus according to the invention.
Figure 2:
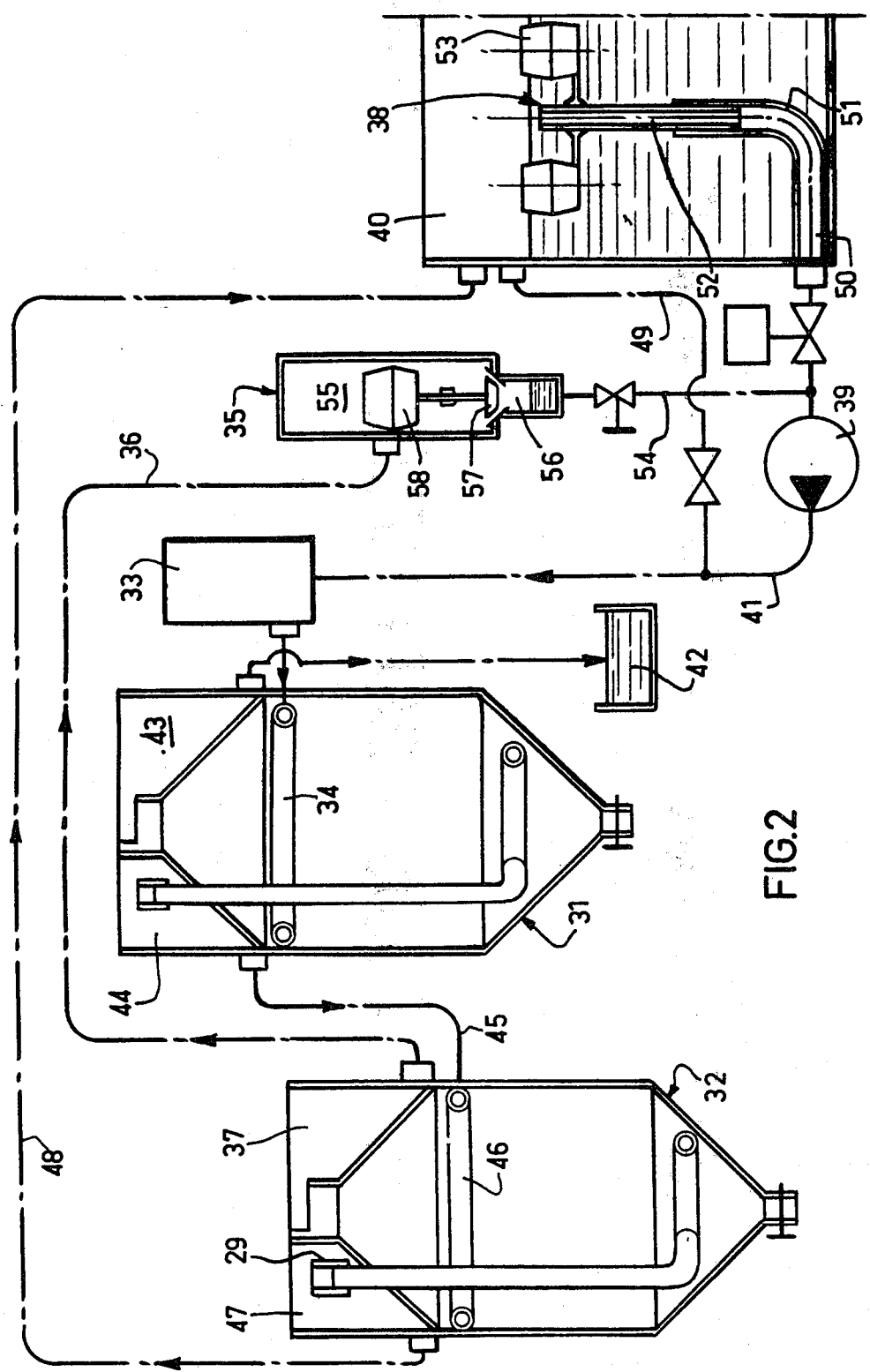
FIG. 2 is a diagrammatical view partly in section of a continuous separation plant according to the invention.
Figure 3:
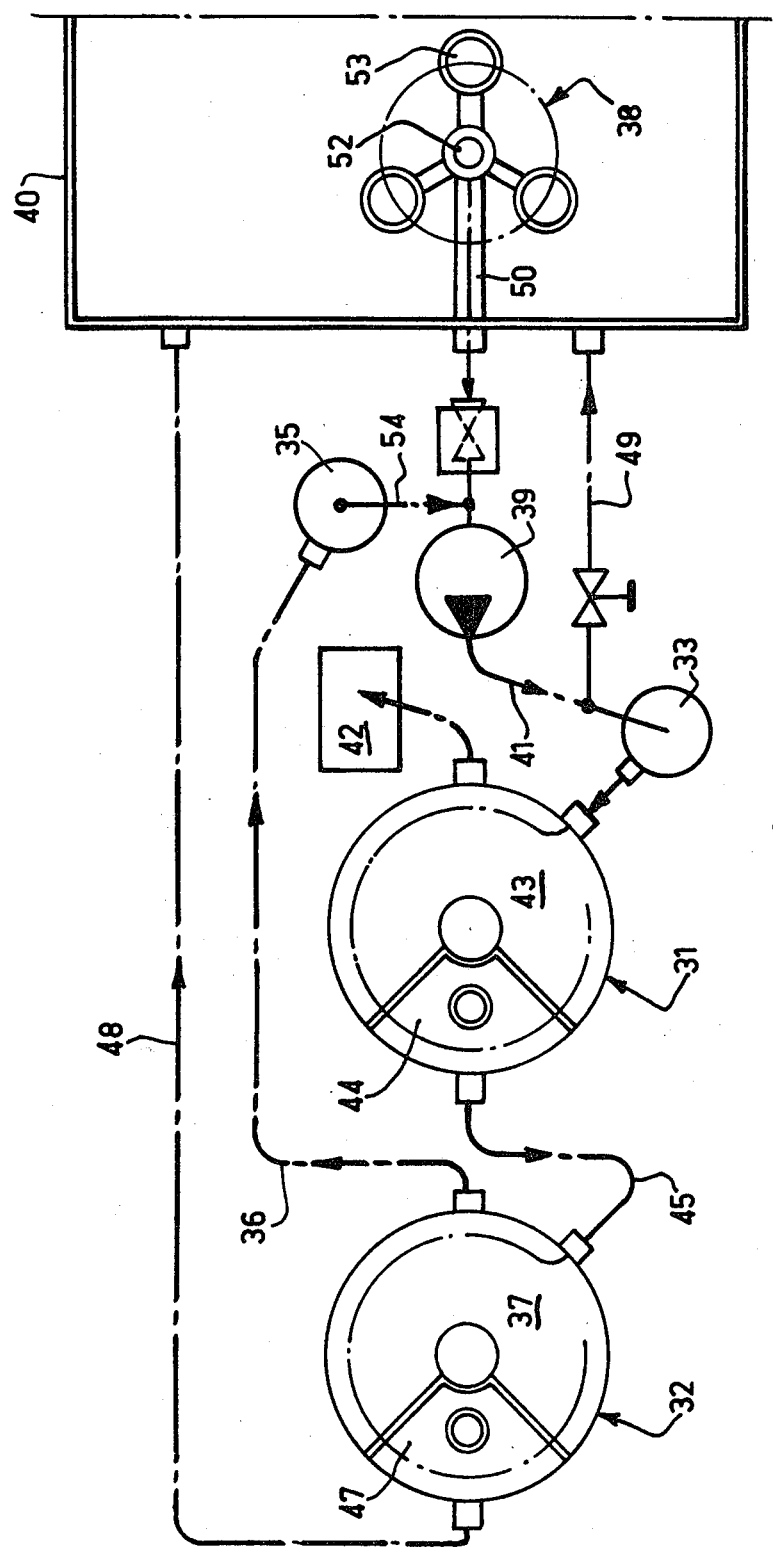
FIG. 3 is a diagrammatical view from below of the plant in FIG. 2.

Such as shown in FIG. 1, the apparatus for the continuous separation of two immiscible liquids comprises a cylindrical tank 1 of sheet metal resistant to oxidation, the interior space of said tank being divided into three separate chambers, viz. a main lower so-called separation chamber 2, and two collecting chambers 3 and 4, respectively, located above separation chamber 2 and separated therefrom by a partition 5 in the form of a funnel which converges upwards and which constitutes the upper boundary wall of the separation chamber. The two upper collecting chambers 3 and 4 are in turn separated from each other by vertical radial partitions 6 and 7. The top of the funnel formed by the separating partition 5 has a port 8 which opens into collecting chamber 4 and is isolated from collecting chamber 3 by a vertical cylindrical partition 9 which joins the two radial partitions 6 and 7 by extending around said port 8.

Disposed within separation chamber 2 and at the bottom of the upper wall in the form of an upwardly converging funnel 5 is a stactic distributor 10 of toroidal shape formed of a peripheral duct which extends horizontally about the side wall of tank 1 close to the circular junction of the upper frustoconical wall 5 with the cylindrical side wall of tank 1. In its upper portion, the wall of the toroidal duct forming the static distributor 10 has a plurality of distribution holes 11 spaced along the toroidal duct and opening upwardly towards the bottom of funnel 5. The diameters of the holes and spacings therebetween are so selected as to obtain uniform flow-rate and velocity of the flows distributed by distributor 10. The static distributor 10 is connected to a feed tube 12 crossing the side wall of tank 1 in sealed relationship therewith and through which the mixture M of the two liquids to be separated is fed.

Disposed within the separation chamber at the bottom thereof is a hollow header element 13 of toroidal shape consisting of an annular duct having at its lower portion a plurality of take-off holes 14 regularly spaced all along said duct, the latter being connected to a vertical riser 15 which extends through a sealed connection across the funnel-shaped upper wall 5, delimiting the upper portion of the separation chamber, and extends vertically into the collecting chamber 3 to open therein slightly lower than the outlet port 8 at the top of funnel 5, wherefrom it is separated by the vertical cylindrical partition 9.

To allow adjustment of the level reached by the outlet port 16 of the riser, the upper end of the latter is equipped with an adjustment sleeve 17 which may be shifted vertically, for instance by threaded engagement with the end of duct 15. For the apparatus of the invention to be operative, it is required that there exists a difference of level between the two outlet ports 8 and 16 of funnel 5 and riser 15 respectively, port 16 being always maintained at a lower level so that flow from chamber 2 to chamber 3 is ensured under the principle of communicating vessels.

Discharge ducts 18 and 19 for chambers 3 and 4, respectively, are provided at the lower portion of said chambers just above the junction line of the bottom of funnel 5 with the side wall of tank 1. As concerns the bottom 20 of said tank, this has preferably the shape of frusto-conical downwardly converging funnel apertured at its center and prolonged by a cylindrical drain piping 21 closed in normal operation by a tight valve 22. The toroidal header duct 13 provided at the lower portion of separation chamber 2 is preferably arranged in the interior and at the middle of the height of funnel 20 which forms the frusto-conical bottom of separation chamber 2.

The above-described apparatus according to the invention operates as as follows:

The mixture M of the two liquids to be separated, which may be for example a spent washing water issuing from an industrial cleaning machine and having oil droplets suspended therein, is fed to the static distributor 10 through the radial feed duct 12 and emerges from the distributor through holes 11 in the form of a multitude of small parallel flows directed upwards along the side wall of tank 1 and towards the upper funnel 5, thus affording a mixture feed with uniform velocity and quantity distribution at the bottom of funnel 5. Each of said flows consists of a stream of mixture to be treated, e.g. of washing liquid, having suspended therein fine droplets of a second, immiscible liquid of lower specific gravity such as, for instance, oil. Once the apparatus has reached its normal operating conditions, the separation chamber 2 is full of mixture to a level flush with the edge of the outlet port 8 at the top of funnel 5. As a result, on the one hand, of the injection of the mixture flows in the liquid mass contained in chamber 2 and, on the other hand, of the difference in specific gravity between the two immiscible fluids, the droplets of the liquid having the lower specific gravity will rise at a velocity higher than that of the particles of the heavier liquid which are gradually decelerated, then stopped before returning downwards, while the droplets of the lighter liquid proceed upwardly along funnel 5, on the one hand, due to of the initial velocity at which they entered the tank and, on the other hand, due to the difference in specific gravity and to coalescence, the latter effect being promoted by the funnel convergence. At the top of cone 5 and at the level of outlet port 8, the lighter liquid droplets merge due to their concentration into a light liquid phase excluding any heavy liquid particles and this light liquid phase overflows into chamber 4 through port 8 as diagrammatically shown by arrows in FIG. 1. The thus recovered light liquid, such as oil, will gather at the lower portion of chamber 4 before being discharged through discharge duct 19 to a recovery vat.

Simultaneously, the particles of the heavier liquid will flow towards the bottom through the central zone of the tank without creating counter-flow in the coalescence zone along the wall of the funnel. Said particles are caught by the take-off holes 14 of toroidal header 13 before flowing upwards in the riser 15 and emerging into the collecting chamber 3, the circulation of the heavier liquid being ensured under the principle of communicating vessels as a result of the difference in level between the two outlet ports 8 and 16. It will be noted that since the take-off holes 14 are located at the lower portion of toroidal duct 13, the fluid streams exiting from the tank are compelled to follow an arcuate path and to flow around the wall of header 13, this tending to promote coalescence in the region of holes 14 of the oil droplets still suspended in the heavier liquid such, for example, as washing liquid.

The largely purified liquid which emerges from port 16 and is received in collecting chamber 3 will gather at the bottom of said chamber and be removed through discharge duct 18.

The solid components possibly suspended in the mixture present in separation chamber 2 will settle out from the latter and gather on the frusto-conical bottom 20 of said chamber, which may be drained at regular intervals by opening valve 22 of the lower outlet ducting 21.

Since the flow of mixture M entering the separation tank 2 is finely divided into a multitude of liquid streams emerging from the holes 11 in distributor 10, the jet force is quite moderate and the turbulence resulting from the introduction of said mixture flow is substantially reduced and will only disturb to a very low degree the laminar flow of the liquid mass in separation chamber 2. Moreover, since the injection of the small mixture flows is effected both at the upper portion and at the periphery of chamber 2, the liquid mass in the central zone of the separation chamber is still less disturbed thereby and will experience a slow, continuous downward motion towards the take-off holes 14 of the lower header 13.

By thus avoiding an useless mixing of the liquid mass in the separation enclosure when introducing the mixture, maximum facility is afforded for the natural separation between the liquids of different specific gravity as well as for the coalescence of the lighter liquid droplets.

It will further be appreciated that the sleeve for adjusting the difference of level between the outlet ports 8 and 16 allows this difference to be adjusted with high accuracy taking into account the depth of the lighter liquid layer gathered at the top of funnel 5, this making it possible to skim at will the light liquid phase forming said layer without risk of causing overflow of the heavier liquid into collecting chamber 4.

A separation plant could include but one of the above described apparatuses, since the output and the purification capacity thereof are sufficient; however, according to the invention, to provide an extremely high degree of separation, use is made of a set of at least two apparatuses which are series-connected and arranged at different levels, these apparatuses being connected to each other in a manner specific to the invention.

This plant for continuous separation with a very high degree of efficiency comprises, in addition to the two previously mentioned apparatuses 31 and 32, an expansion and degassing vat 33 having its outlet connected to the inlet of distributor 34 of the first apparatus 31 in the line and a reservoir 35 for recycle under load, with float-operated regulation, having its inlet connected through a duct 36 to the outlet of the chamber 37 collecting the light liquid phase of the second apparatus 32 in the line. The plant moreover includes take-off means 38 with a constant level difference which are immersed in the treated bath in tank 40, and a pumping system 39 for transferring the mixture from take-off means 38 to expansion vat 33 through a duct 41, and a vat 42 for recovering the light liquid phase such as oil obtained from the outlet of the collecting chamber 43 of the first apparatus 31 in the separation line. The purified heavy liquid phase issuing from the collecting chamber 44 of apparatus 31 is fed by gravity through a duct 45 to the inlet of the distributor 46 of the second apparatus 32 in the line to be more extensively purified, and the heavy liquid phase from the collecting chamber 47 of this second apparatus 32 is returned to the bath-containing tank 40 through a duct 48.

A discharge duct 49 is also provided, said duct being branched off between the duct 41 connecting the outlet of pump 39 to the inlet of expansion vat 33 and the tank 40 containing the bath to be treated.

As previously stated, recycle reservoir 35 is fed from collecting chamber 37 through duct 36 with a mixture which has a variable light phase concentration but may have a substantial heavy phase content, the proportions thereof being adjusted as a function of the degree of purity desired at the outlet of the heavy phase collecting chamber 47, and the outlet of said recycle reservoir 35 is connected through a duct 54 to the inlet of pump 39. Reservoir 35 is divided into two superposed chambers, viz. an upper chamber 55 for receiving the liquid and a lower chamber 56 for discharging the same liquid, communication between these two chambers being controlled by a valve-member 57 having its opening and gravity closing motions controlled by a float 58 located in the liquid receiving chamber 55.

The above-described plant operates as follows: The sliding tube 52 of take-off means 38 is supported by floats 53 at a constant depth below the surface-level of the bath to be treated contained in tank 40, so that the level difference between the bath level and the mouth of sliding tube 52 is kept constant irrespective of the height of the bath level in the tank. The mixture is pumped by pump 39 and fed to expansion vat 33 through piping 41. The main function of the expansion and degassing vat 33 is to remove any gas bubble carried by the mixture and liable to disturb the liquid mass being treated in the separation apparatuses; this expansion vat 33 therefore plays a very important part in as much as it acts as a buffer to avoid any turbulence and disturbance with the mixture being treated. The vat 33 also acts as a damper by stabilizing the flow from the pump which may be disturbed by the feeding of the liquid from the recycle reservoir. The mixture to be treated is then directly transferred from expansion vat 33 to the distributor 34 of the first apparatus 31 in the treatment line. A first separation occurs in this apparatus 31 according to the previously described process and a light liquid phase such as oil is gathered in collecting chamber 43 and recovered in vat 42 while a heavy phase is gathered in collecting chamber 44 and directly transferred through duct 45 to the distributor 46 of the second treatment apparatus 32 for a more extensive separation. A similar separation process occurs in the second apparatus of the line, but the adjustment of this second apparatus by means of the outlet sleeve (29) of the riser of the dense phase header is effected in such manner that the light phase is carried over into collecting chamber (37) by a certain amount of heavy phase. The mixture collected in this chamber (37) is discharged to the reservoir (35) to be recycled to the inlet of the pump (39). The heavy liquid phase collected in said chamber 47 is thereafter returned through duct 48 to tank 40 containing the bath, this heavy liquid phase being practically wholly cleared of the light particles and also of the heavy solid particles, which settled at the bottom of the two separation apparatuses 31 and 32. The mixture from the chamber 37 of the second apparatus is collected in the receiving chamber 55 of reservoir 35 and affords air-tightness of valve-member 57. As long as the level of the liquid in chamber 55 does not reach float 58, valve-member 57 remains seated. When the level of liquid in chamber 55 reaches float 58 and raises the latter, valve-member 57 re-effects communication and a certain amount of the mixture collected in the second apparatus 32 is recycled in the circuit upstream of pump 39.

It will be noted that in vat 40, in the absence of mixing, a first gravity separation already occured, the light liquid phase raising to the surface and forming a surface layer on the surface of the bath. The use of take-off means with a constant level difference makes it possible to adjust this level difference and to remove from the bath only the surface layer thereof which has the highest content of lower specific gravity liquid and the concentration of said liquid in the mixture pumped through pump 39 is still increased by the mixture recycled from the recycle reservoir 35.

The plant according to the invention permits a very extensive separation between two immiscible liquid phases in a bath, said separation being effected continuously, without interruption, and permanently allowing for replacement of the bath either between two cleaning runs or even during the scouring process.

It will be appreciated that, except for the pumping energy, no power is consumed in the plant to effect the treatment, this rendering the plant especially economical. Moreover, the simplicity of the apparatuses used and of the plant itself warrants for the sturdiness thereof and for the limited servicing required thereby, a mere emptying with a cleansing of the tanks being required from time to time.

Finally, it will be appreciated that the apparatuses according to the invention merely act by promoting the natural process of separation by gravity and coalescence without intervention to force said separation especially by means of filters or other devices whereof the maintenance, cleaning and replacement are particularly expensive.

It will be understood that the scope of the invention is not limited to the single embodiment described above by way of non restrictive example, but also extends to any alternate embodiment which would only differ therefrom by constructional details.

I claim:

1. Apparatus for separating two immiscible liquids of different specific gravity which includes a tank having defined therein an inlet and two outlets, separate chambers for collecting the light and heavy liquid phases and a separation chamber containing a light phase header in its upper portion, a heavy phase header in its lower portion and a static mixture distributor between said two headers, said headers affording communication between said separation chamber and said corresponding collecting chambers, said static distributor being operatively connected to said inlet and each of said collecting chambers being operatively connected to a separate one of said outlets, characterized in that the upper portion of said separation chamber is delimited by a wall in the shape of an upwardly converging funnel including at its top a port which opens into said light phase collecting chamber, in that said distributor comprises an internal peripheral duct which extends horizontally about the side wall of said tank and defines distribution holes spaced about the latter and in that said heavy phase header comprises a hollow header element provided with take-off holes on its lower side and a riser which operatively communicates with the interior of said heavy phase header element and opens into said heavy phase collecting chamber at a level slightly lower than that of said funnel port.

2. Apparatus according to claim 1, characterized in that said distribution holes in said distributor open upwardly, close to the bottom of said funnel.

3. Apparatus according to claim 1, characterized in that said heavy phase header essentially consists of said a loop-shaped duct extending horizontally close to the bottom of separation chamber, and of a vertical riser operatively connected to said duct and having its outlet port slightly lower than said funnel port.

4. Apparatus according to claim 3, characterized in that said bottom of the separation chamber is in the shape of a downwardly converging funnel and in that said heavy phase header duct is arranged substantially at the middle of the height of said downwardly converging funnel.

5. Apparatus according to any one of claims 1 to 4, characterized in that the level of the said riser outlet port is adjustable in height.

6. Apparatus according to claim 5, characterized in that the upper end of said riser is provided with a sleeve for adjusting the outlet level.

7. Apparatus according to any one of claims 1 to 4, characterized in that the bottom and the top of said separation chamber are frustoconical and are each provided with a central outlet port.

8. Plant for separating two immiscible liquids contained in a bath to be purified, characterized in that said plant comprises a battery of first and second apparatuses according to any one of claims 1 to 4, which are series-connected, an expansion and degassing vat connected to the inlet of said distributor of said first apparatus, a reservoir for recycle under load with a float-operated regulation, take-off means with a constant level difference immersed in the bath and means for pumping the liquids from the bath to said expansion vat, the outlets of said heavy liquid phase collecting chambers of said first and second apparatuses being respectively connected to said static distributor of said second apparatus and to said tank containing the bath to be purified while the outlets of said light liquid phase collecting chambers of said first and second apparatuses are respectively adapted to be connected to a recovery vat and are operatively connected to said recycle reservoir, the outlet of which is operatively connected to said pumping means.

9. Plant according to claim 8, characterized in that said take-off means with a constant level difference comprise a fixed duct connected to said pumping means and provided with a vertical end section, a tube sliding in said section and floats supporting said tube at a predetermined depth in the bath.

* * * * *

UNITED STATES PATENT OFFICE
CERTIFICATE OF CORRECTION

Patent No. 4,406,789     Dated September 27, 1983

Inventor(s) Francois Brignon

It is certified that error appears in the above-identified patent and that said Letters Patent are hereby corrected as shown below:

On the abstract page, in the identification of the assignee, delete "Establissemens" and insert -- Etablissements --.

Signed and Sealed this

Twenty-seventh Day of March 1984

[SEAL]

Attest:

GERALD J. MOSSINGHOFF

Attesting Officer     Commissioner of Patents and Trademarks